United States Patent
Dong et al.

(10) Patent No.: US 8,363,603 B2
(45) Date of Patent: Jan. 29, 2013

(54) USER SEPARATION IN SPACE DIVISION MULTIPLE ACCESS FOR A MULTI-CARRIER COMMUNICATION SYSTEM

(75) Inventors: Min Dong, San Diego, CA (US); Tingfang Ji, San Diego, CA (US); Dhananjay Ashok Gore, San Diego, CA (US); Alexei Gorokhov, San Diego, CA (US); Arak Sutivong, Bangkok (TH)

(73) Assignee: QUALCOMM Incorporated, San Diego, CA (US)

( * ) Notice: Subject to any disclaimer, the term of this patent is extended or adjusted under 35 U.S.C. 154(b) by 1326 days.

(21) Appl. No.: 11/333,890

(22) Filed: Jan. 18, 2006

(65) Prior Publication Data
US 2006/0285504 A1 Dec. 21, 2006

Related U.S. Application Data

(60) Provisional application No. 60/691,434, filed on Jun. 16, 2005.

(51) Int. Cl.
*H04W 4/00* (2009.01)
(52) U.S. Cl. ........ 370/329; 370/341; 370/310; 370/317; 370/318
(58) Field of Classification Search .................. 370/334, 370/310, 317, 319, 321, 322, 329, 341, 344, 370/347, 318
See application file for complete search history.

(56) References Cited

U.S. PATENT DOCUMENTS

| | | | |
|---|---|---|---|
| 5,886,988 A * | 3/1999 | Yun et al. .................. | 370/329 |
| 6,708,037 B1 * | 3/2004 | Moulsley et al. .......... | 455/452.1 |
| 6,870,888 B1 * | 3/2005 | Shapiro et al. ............. | 375/260 |
| 6,928,287 B2 | 8/2005 | Trott et al. | |
| 6,956,838 B2 | 10/2005 | Ertel et al. | |
| 6,973,314 B2 | 12/2005 | Wilson et al. | |
| 6,999,771 B1 * | 2/2006 | Kasapi et al. .............. | 455/450 |
| 7,492,743 B2 | 2/2009 | Uhlik | |
| 7,536,205 B2 * | 5/2009 | Van Rensburg et al. ... | 455/562.1 |
| 7,583,620 B2 | 9/2009 | Jeon et al. | |

(Continued)

FOREIGN PATENT DOCUMENTS

| | | |
|---|---|---|
| AU | 2003203427 B2 | 9/2004 |
| EP | 0786914 A2 | 7/1997 |

(Continued)

OTHER PUBLICATIONS

Fuchs et al., "A novel tree-based scheduling algorithm for the downlink of multi-user MIMO systems with ZF beamforming," Acoustics, Speech, and Signal Processing, IEEE International Conference on Philadelphia, Pennsylvania, pp. 1121-1124, Mar. 18-23, 2005.

(Continued)

*Primary Examiner* — Huy Phan
(74) *Attorney, Agent, or Firm* — Dmitry R. Milikovsky; Howard H. Seo

(57) ABSTRACT

Apparatuses and methodologies are described that increase system capacity in a multi-access wireless communication system. Spatial dimensions may be utilized to distinguish between multiple signals utilizing the same channel and thereby increase system capacity. Signals may be separated by applying beamforming weights based upon the spatial signature of the user device-base station pair. Grouping spatially orthogonal or disparate user devices on the same channel facilitates separation of signals and maximization of user device throughput performance. User devices may be reassigned to groups periodically or based upon changes in the spatial relationships between the user devices and the base station.

40 Claims, 13 Drawing Sheets

U.S. PATENT DOCUMENTS

| | | | |
|---|---|---|---|
| 7,599,420 B2 * | 10/2009 | Forenza et al. | 375/141 |
| 7,656,936 B2 | 2/2010 | Li et al. | |
| 2002/0051436 A1 * | 5/2002 | Ertel et al. | 370/335 |
| 2003/0064753 A1 * | 4/2003 | Kasapi et al. | 455/561 |
| 2003/0064754 A1 * | 4/2003 | Wilson et al. | 455/562 |
| 2004/0062211 A1 * | 4/2004 | Uhlik | 370/278 |
| 2004/0132454 A1 * | 7/2004 | Trott et al. | 455/447 |
| 2004/0146024 A1 * | 7/2004 | Li et al. | 370/334 |
| 2004/0193649 A1 | 9/2004 | Doshida et al. | |
| 2005/0083972 A1 * | 4/2005 | Tzannes et al. | 370/468 |
| 2005/0122912 A1 * | 6/2005 | Jeon et al. | 370/252 |
| 2006/0067269 A1 * | 3/2006 | Jugl et al. | 370/329 |

FOREIGN PATENT DOCUMENTS

| | | |
|---|---|---|
| JP | 2004023163 | 1/2004 |
| JP | 2005094337 | 4/2005 |
| WO | 96/22662 A | 7/1996 |
| WO | WO9830047 | 7/1998 |
| WO | WO9929050 | 6/1999 |
| WO | 02/33848 A2 | 4/2002 |
| WO | 2005/029730 A | 3/2005 |

OTHER PUBLICATIONS

Guanghan et al., "Throughput multiplication of wireless LANS for multimedia services: SDMA protocol design," Proceedings of the global telecommunications conference, San Francisco, vol. 3, pp. 1326-1332, Nov. 28-Dec. 2, 1994.

International Search Report and Written Opinion—PCT/US06/023481, International Search Authority—European Patent Office, Feb. 12, 2007.

* cited by examiner

USER SEPARATION IN SPACE DIVISION MULTIPLE ACCESS FOR A MULTI-CARRIER COMMUNICATION SYSTEM

CLAIM OF PRIORITY UNDER 35 U.S.C. §119

The present Application for Patent claims priority to Provisional Application Ser. No. 60/691,434, entitled "User Separation In Space Division Multiple Access For A Multi-Carrier Communication System," filed Jun. 16, 2005, assigned to the assignee hereof, and expressly incorporated by reference herein.

BACKGROUND

I. Field

The following description relates generally to wireless communications, and, amongst other things, to communications in a multiple-carrier, multiple-access communication system.

II. Background

Wireless networking systems have become a prevalent means by which a majority of people worldwide has come to communicate. Wireless communication devices have become smaller and more powerful in order to meet consumer needs and to improve portability and convenience. The increase in processing power in mobile devices such as cellular telephones, personal digital assistants (PDAs) and the like has lead to an increase in demands on wireless network transmission systems.

A multiple-access system can concurrently support communication for multiple mobile devices or terminals. Multiple terminals may simultaneously communicate with a base station of the wireless network transmission system. This simultaneous communication may be achieved by multiplexing the multiple data transmissions such that the data transmissions are orthogonal to one another in time, frequency, code and/or space domain. In general, complete orthogonality is not achieved due to various factors such as channel conditions, receiver imperfections and so on. Nevertheless, substantially orthogonal multiplexing ensures that the data transmission for each mobile device minimally interferes with the data transmissions for the other mobile devices.

In code division multiplexing based techniques, signals are encoded with an orthogonal or semi-orthogonal code type. Code division systems employ codes that facilitate uniquely identifying individual communication channels. Encoded signals are typically interpreted as noise by receivers that do not employ the same code to decode the signal. The number of codes that can be assigned simultaneously is typically limited by the length of the code.

In time division based techniques, a band is split time-wise into sequential time slices or time slots. Each user device assigned to a channel is provided with a time slice for transmitting and receiving information in a round-robin manner. For example, at any given time t, a user device is provided access to the channel for a short burst. Then, access switches to another user device that is provided with a short burst of time for transmitting and receiving information. The cycle of "taking turns" continues, and eventually each user device is provided with multiple transmission and reception bursts.

Frequency division based techniques typically separate the frequency spectrum into distinct channels by splitting the frequency spectrum into uniform chunks of bandwidth. For example, the frequency spectrum or band allocated for wireless cellular telephone communication can be split into 30 channels, each of which can carry a voice conversation or, for digital service, digital data. Each channel can be assigned to only one user device or terminal at a time. One commonly utilized frequency division system is the orthogonal frequency division multiple access (OFDMA) system, which uses orthogonal frequency division multiplexing (OFDM). OFDM effectively partitions the overall system bandwidth into multiple orthogonal frequency channels. An OFDMA system may use time and/or frequency division multiplexing to achieve orthogonality among multiple data transmissions for multiple terminals. For example, different terminals may be allocated different channels, and the data transmission for each terminal may be sent on the channel(s) allocated to this terminal. By using disjoint or non-overlapping channels for different terminals, interference among multiple terminals may be avoided or reduced, and improved performance may be achieved.

The number of channels available for data transmission is limited (to K) by the OFDM structure used for the OFDMA system. The limited number of channels places an upper limit on the number of terminals that may transmit and/or receive simultaneously without interfering one another. In certain instances, it may be desirable to allow more terminals to transmit and/or receive simultaneously, e.g., to better utilize the available system capacity.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a terminal. A terminal within the coverage area of that base station can be interested in receiving one, more than one or all the data streams carried by the composite stream. Likewise, a terminal can transmit data to the base station or another terminal. Such communication between base station and terminal or between terminals can be degraded due to channel variations and/or interference power variations. For example, the aforementioned variations can affect base station scheduling, power control and/or rate prediction for one or more terminals.

Conventional network data transmission protocols are susceptible to scheduling limitations and transmission capacity limits, resulting in diminished network throughput. Multiple antennas at transmitters and receivers open up space dimensions for data transmission increasing system capacity. With additional space dimensions available, there exists a need in the art for a system and/or methodology of improving throughput and maximizing system capacity in wireless network systems.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with increasing system capacity in a multi-access wireless communication system. Spatial dimensions may be utilized to distinguish between multiple signals utilizing the same channel and thereby increase system capacity. Signals may be separated by applying beamforming weights based upon the spatial signature of the user device-base station pair. Grouping substantially spatially disparate user devices on the same channel facilitates separation of signals. User devices may be reassigned to groups periodically or based upon changes in the spatial relationships between the user devices and the base station.

According to a related aspect, a method for increasing system capacity for a wireless communication environment can comprise determining a spatial signature for a first user device, assigning the first user device and a second user device to a plurality of channels such that when the first user device and the second user device are assigned to one of the plurality of channels the first and second user device are substantially spatially disparate and determining a weight based at least in part on the spatial signature of the first user device. The weight is applied to at least one transmission between the first user device and a base station. Additionally, the method can comprise assigning the first user device and the second user device to at least one subset based upon a spatial grouping characteristic and selecting user devices from the at least one subset to assign to the channel, such that substantially spatially disparate user devices are assigned to the same channel. Moreover, the method can comprise reassigning the first user device either periodically or based at least in part upon a change in the spatial signature.

According to another aspect, a wireless communication apparatus can comprise a processor that determines a spatial signature for a first user device, assigns the first user device to a channel, such that the first user device is substantially spatially disparate to a second user device assigned to the channel, and determines a weight based at least in part on the spatial signature of the first user device. The apparatus can also comprise a memory, coupled to the processor that stores the weight for the first user device. The weight is applied to at least one transmission between the first user device and a base station. The processor can assign the first user device and the second user device to at least one subset based upon a spatial grouping characteristic and select user devices from the at least one subset to assign to the channel, such that substantially spatially disparate user devices are assigned to the same channel. The process can reassign the first user device either periodically or based at least in part upon a change in the spatial signature or system performance.

According to yet another aspect, an apparatus for increasing system capacity in a wireless communication environment comprises means for determining a spatial signature for a first user device, means for assigning the first user device and a second user device to a plurality of channels, such that when the first user device and the second user device are assigned to one of the plurality of channels the first and second user device are substantially spatially disparate and means for determining a weight based at least in part on the spatial signature of the first user device, the weight is applied to at least one transmission between the first user device and a base station. Additionally, the apparatus can comprise means for assigning the first user device and the second user device to at least one subset based upon a spatial grouping characteristic and means for selecting user devices from the at least one subset to assign to the channel, such that substantially spatially disparate user devices are assigned to the same channel.

Yet another aspect relates to a computer-readable medium having stored thereon computer-executable instruction for determining a spatial signature for a first user device, assigning the first user device and a second user device to a plurality of channels, such that when the first user device and the second user device are assigned to one of the plurality of channels the first and second user device are substantially spatially disparate and determining a weight based at least in part on the spatial signature of the first user device, the weight is applied to at least one transmission between the first user device and a base station. Moreover, the medium can comprise instructions for assigning the first user device and the second user device to at least one subset based upon a spatial grouping characteristic and selecting user devices from the at least one subset to assign to the channel, such that substantially spatially disparate user devices are assigned to the same channel.

Still another aspect relates to a processor that executes instructions for increasing system capacity in a multiple access wireless communication environment, the instructions comprising determining a spatial signature for a first user device, assigning the first user device and a second user device to a plurality of channels, such that when the first user device and the second user device are assigned to one of the plurality of channels the first and second user device are substantially spatially disparate and determining a weight based at least in part on the spatial signature of the first user device, the weight is applied to at least one transmission between the first user device and a base station.

A further aspect sets forth a user device that facilitates communicating over a wireless network, comprising a component that determines a spatial signature for the user device, a component that receives a channel assignment, such that when the first user device and a second user device are assigned to one of the plurality of channels the first and second user device are substantially spatially disparate and a component that determines a weight based at least in part on the spatial signature of the first user device, the weight is applied to at least one transmission between the first user device and a base station.

Yet another aspect sets forth a method for updating channel assignments for a wireless communication environment, comprising obtaining a grouping characteristic standard, determining a current grouping characteristic for user devices, determining if there is a significant difference between the grouping characteristic standard and the current grouping characteristic for the user devices, updating the channel assignment for the user devices if a significant difference exists and determining a weight for the updated user devices. The grouping characteristic standard can be determined by averaging the values of previous grouping characteristics of the user devices.

According to a further aspect, a wireless communication apparatus can comprise a processor that obtains a grouping characteristic standard, determines a current grouping characteristic for the user devices, determines if there is a significant difference between the grouping characteristic standard and the current grouping characteristic for the user devices, updates a channel assignment for the user devices if a significant difference exists and calculates a weight for the user devices. In addition, the apparatus can comprise a memory, coupled to the processor, that stores the weight for the user devices.

According to yet another aspect, an apparatus for updating channel assignments in a wireless communication environment comprises means for obtaining a grouping characteristic standard, means for determining a current grouping characteristic for user devices, means for determining if there is a significant difference between the grouping characteristic standard and the current grouping characteristic for the user devices, means for updating a channel assignment for the user devices if a significant difference exists and means for determining a weight for the updated user devices.

Yet another aspect relates to a computer-readable medium having stored thereon computer executable instructions for obtaining a grouping characteristic standard, determining a current grouping characteristic for user devices, determining if there is a significant difference between the grouping characteristic standard and the current grouping characteristic for the user devices, updating a channel assignment for the user devices if a significant difference exists and determining a weight for the updated user devices.

Still another aspect relates to a processor that executes instructions for updating channel assignments in a wireless communication environment, the instructions comprising obtaining a grouping characteristic standard, determining a current grouping characteristic for one or more user devices, determining if there is a significant difference between the grouping characteristic standard and the current grouping characteristic for the one or more user devices, updating a channel assignment for the one or more user devices if a significant difference exists and determining a weight for the updated one or more user devices.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
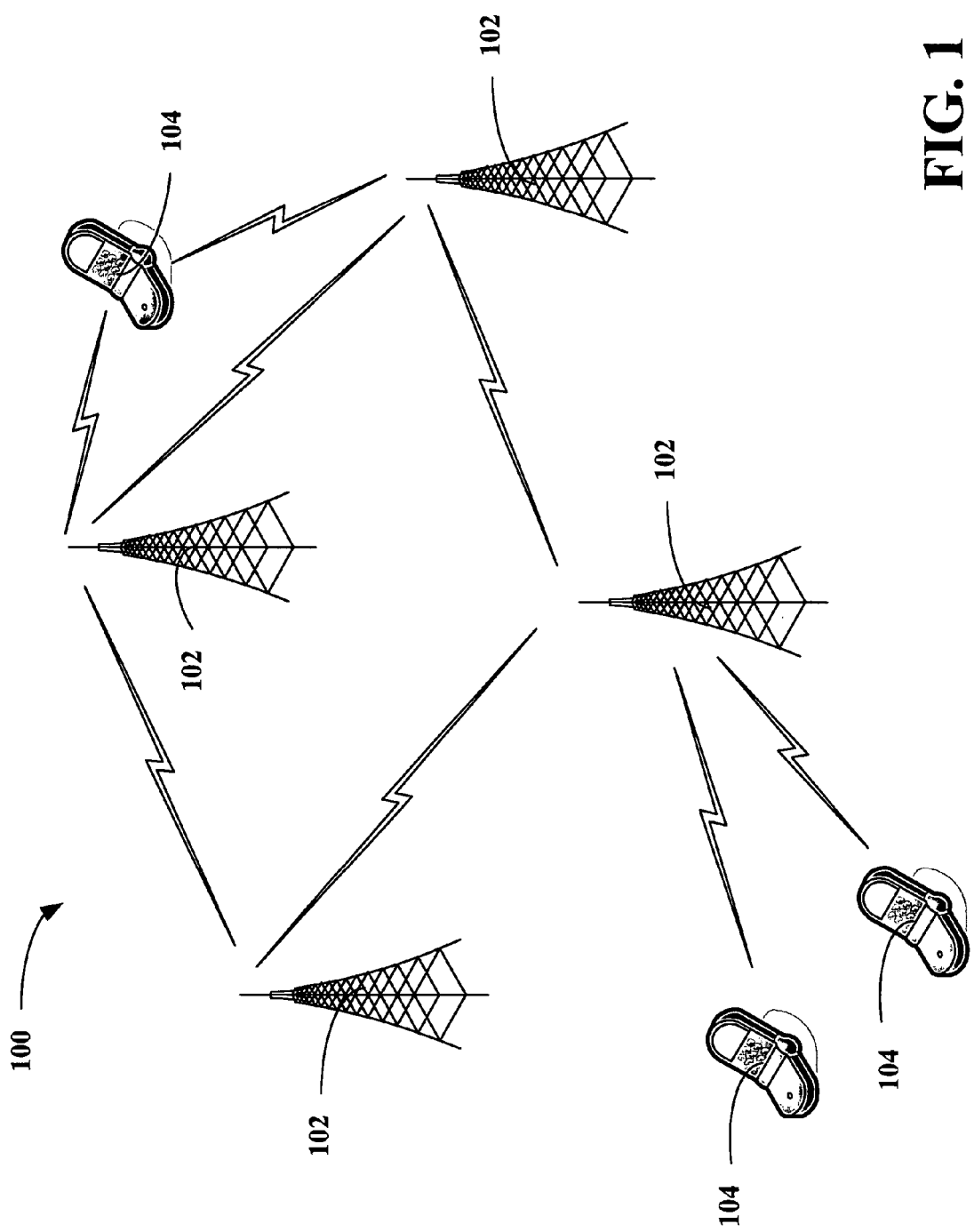
FIG. 1 illustrates a wireless communication system in accordance with various aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to FIG. 1, a wireless communication system 100 in accordance with various embodiments presented herein is illustrated. System 100 can comprise one or more base stations 102 in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless system 100.

Spatial indicia may be utilized to distinguish data transmissions or communications between base stations and multiple mobile devices thereby increasing system capacity. Spatial indicia, as used herein, are any indicator of the spatial relationship between a user device and a base station. Space division multiplexing (SDM) is a technique used in a multiple antenna communication system that utilizes the spatial dimensions to support additional user devices for data transmissions. A space division multiple access (SDMA) system relies on spatial signatures associated with each user device to schedule data transmissions from or to multiple user devices and base stations. In a multiple antenna system, the spatial relationship between the base station and user device is determined based upon the signal received by the antennas at the base station. A spatial signature based upon the spatial relationship can be formed using direction-of-arrival of the signal at the base station, number of signal multipaths, and attenuation of the signal for each base station-user device pair. An SDMA system utilizes the spatial signatures of the base station-user device pair to schedule multiple data transmissions on a channel or carrier that have generally orthogonal or disparate spatial signatures to one another. Although, the spatial signatures are unlikely to be completely spatially orthogonal, if the spatial signatures are substantially orthogonal or significantly disparate, the data transmissions can be distinguished. In general, the less aligned the spatial signatures of the data transmissions, the better the separation of the data transmissions. The "angle" between the spatial signatures can be indicative of how well the spatial signatures are separated. This angle can be quantitatively measured using the inner product of the two spatial signature vectors. The value of the inner product can be determined based upon the direction of arrival, the length of the antenna array and the number of antennas. Generally, the longer the antenna array, the better the angular resolution of the spatial signature and therefore the better the resolvability of the different spatial signatures and spatial multiplexing result. SDM techniques are applicable to forward link and reverse link in time division duplex (TDD) and frequency division duplex (FDD) wireless communication environments.

Figure 2:
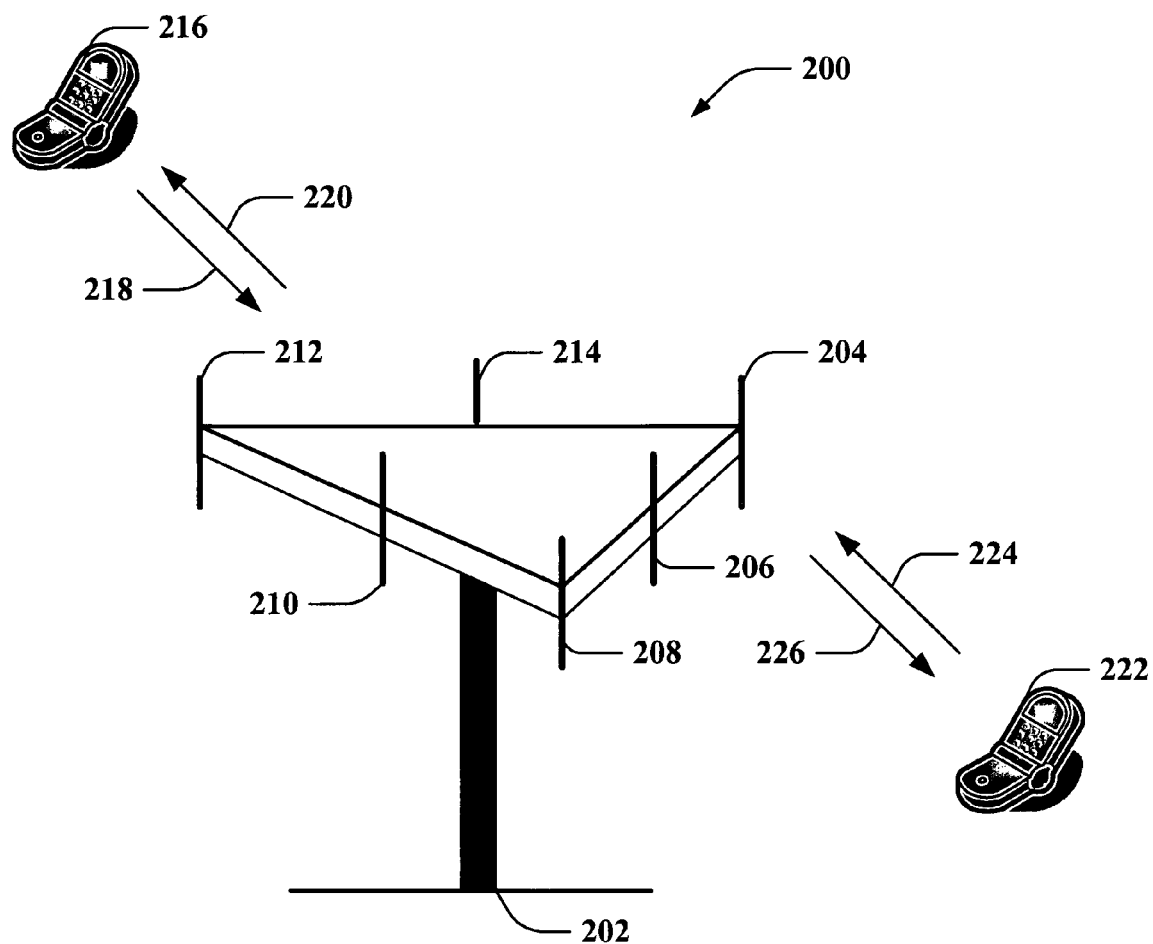
FIG. 2 is an illustration of a wireless communication system according to one or more aspects presented herein.

Referring now to FIG. 2, a multiple access wireless communication system 200 according to one or more embodiments is illustrated. A 3-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Typically, SDM techniques utilize multiple antennas to determine spatial dimensions of a mobile device. Mobile device 216 is in communication with antennas 212 and 214, where antennas 212 and 214 transmit information to mobile device 216 over forward link 220 and receive information from mobile device 216 over reverse link 218. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 126 and receive information from mobile device 222 over reverse link 224.

Each group of antennas and/or the area in which they are designated to communicate may be referred to as a sector of base station 202. In one or more embodiments, antenna groups each are designed to communicate to mobile devices in a sector of the areas covered by base station 202. In communication over forward links 220 and 226, the transmitting antennas of base station 202 can utilize beamforming techniques in order to improve the signal-to-noise ratio of forward links for the different mobile devices 216 and 222. Additionally, a base station using beamforming to transmit to mobile devices scattered randomly through its coverage area causes less interference to mobile devices in neighboring cells/sectors than a base station transmitting through a single antenna to all mobile devices in its coverage area. A base station may be a fixed station used for communicating with the terminals and may also be referred to as an access point, a Node B, or some other terminology. A mobile device may also be called a mobile station, user equipment (UE), a wireless communication device, terminal, access terminal, user device, or some other terminology.

Figure 3:
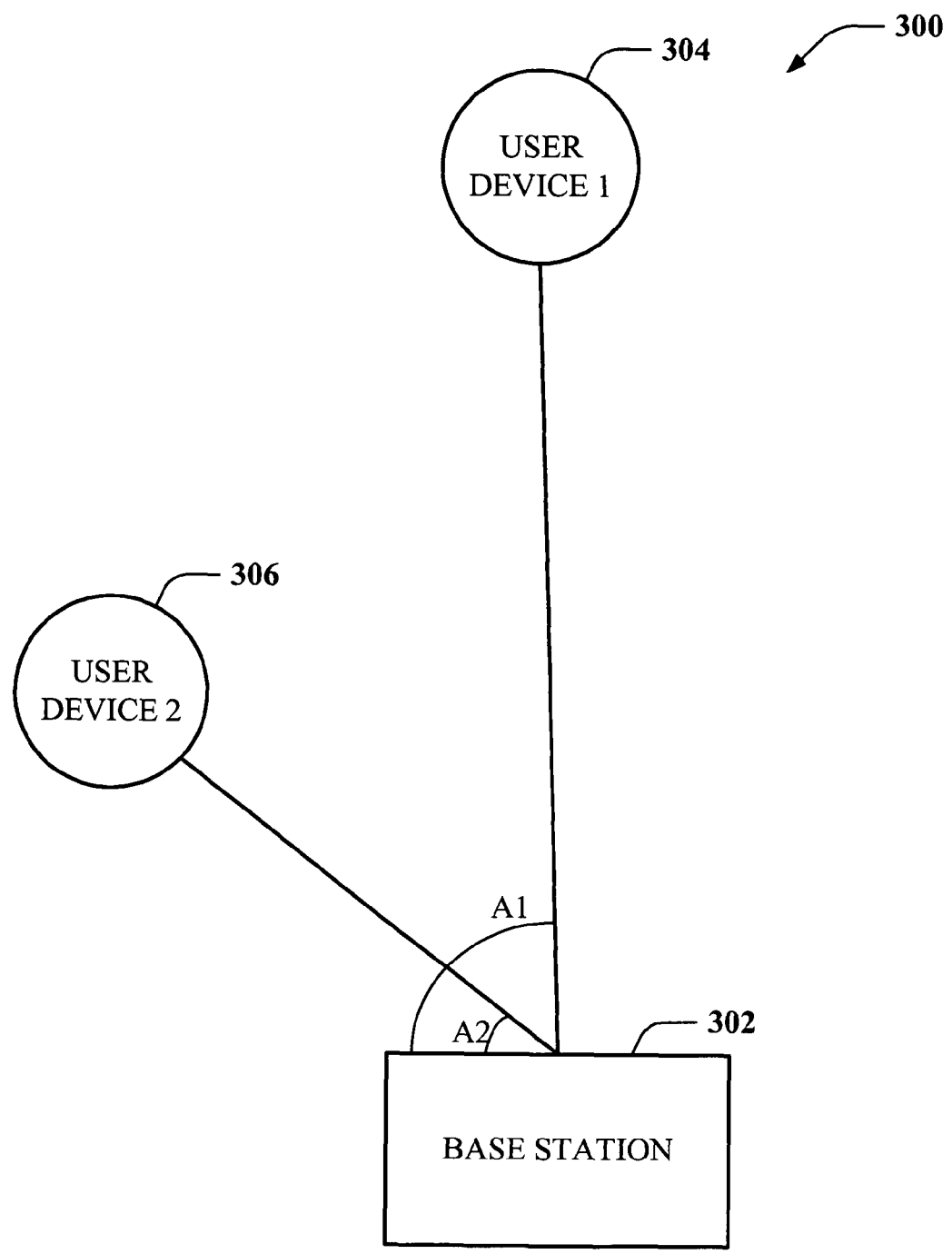
FIG. 3 is an illustration of a wireless communication system according to one or more aspects presented herein.

Referring now to FIG. 3, a wireless communication system 300 is presented in accordance with one or more embodiments. A base station 302 having multiple antennas is in communication with a first user device 304 and a second user device 306. Two user devices are illustrated herein for simplicity. However, multiple user devices may be utilized with a base station. During uplink communication, first user device 304 and second user device 306 transmit signals to base station 302. If the signals utilize the same channel and arrive at substantially the same time, the signals from first user device 304 and second user device 306 may still be distinguished based upon the spatial relationships among the first user device 304, the second user device 306 and the base station 302. As illustrated in FIG. 3, a signal from the first user device 304 arrives at base station 302 at a first angle $\theta_1$, shown as A1, and a signal from the second user device 306 arrives at base station 302 at a second angle $\theta_2$, shown as A2. Based upon reception of a signal at the antennas and the geometry of the antennas, base station 302 can determine the angle of arrival of the signal arrived at base station 302. Various algorithms, methods and techniques can be employed to calculate or estimate the direction of arrival of a signal using multiple antennas. Although FIG. 3 illustrates a two-dimensional spatial relationship between the base station 302 and the user devices, three dimensions may be utilized to distinguish between user device signals. For example, in an area with high-rise buildings or a mountainous region, a vertical component to the spatial relationship may be utilized to separate the user device signals.

The number of antennas can determine the number of signals that can be separated based upon the spatial relationship of the user devices to the base station. A spatial signature, based at least in part on the direction of arrival, can be used as the basis for a beam weight vector to distinguish between signals of spatially orthogonal or disparate user devices. The spatial signature may be a vector with dimensions based upon the number of antennas at the base station. Consequently, the maximum number of user device signals which can be distinguished from each other using the spatial signature is proportional to the number of antennas utilized at the base station. For example, if a base station utilizes two antennas to receive the signal, the base station can distinguish between the signals from two user devices that are substantially spatially orthogonal or disparate utilizing the same traffic channel. Similarly, if a base station utilizes three antennas, the base station can distinguish between three signals from user devices that are substantially spatially orthogonal or disparate utilizing the same traffic channel. One exemplary formula for determining weight vectors is illustrated below:

$$h_1 = G_1[e^{-j2\pi n_0 \cos\theta_1}, \ldots, e^{-j2\pi n_{r-1}\Delta r \cos\theta_1}]$$

Here, $h_1$ is the channel for a first signal, $G_1$ is the path gain for the first signal, n is an antenna, r is the total number of antennas and $\theta_1$ is the angle of arrival of the first signal. The base station can utilize a predetermined threshold to determine whether the difference between the spatial signatures is sufficient to distinguish between the signals.

Referring to FIGS. 4-8, methodologies relating to increasing capacity in wireless communication systems are illustrated. For example, methodologies can related to using SDM in an FDMA environment, an OFDMA environment, an interleaved frequency division multiple access (IFDMA) environment, Localized Frequency Division Multiple Access (LFDMA) environment, a CDMA environment, a WCDMA environment, a TDMA environment or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more embodiments.

Figure 4:
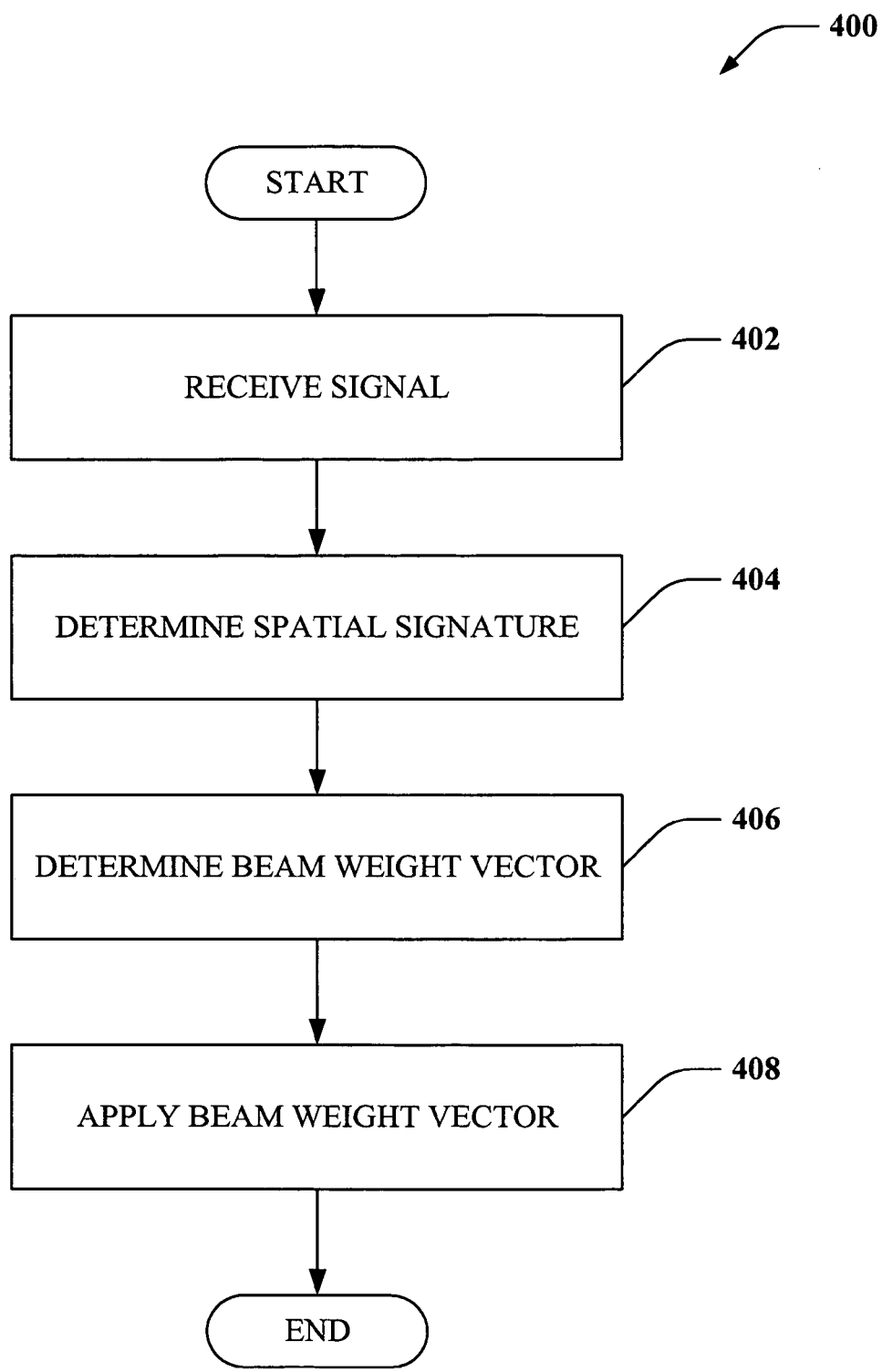
FIG. 4 illustrates a methodology for an uplink transmission in accordance with one or more aspects presented herein

Referring now to FIG. 4, a methodology 400 for an uplink transmission in a wireless communication environment in accordance with one or more embodiments presented herein is illustrated. The spatial relationships between user devices and a base station can be used to distinguish between two or more user device signals utilizing the same signal frequency. At 402, a signal transmitted by a user device is received at two or more antennas at the base station. A spatial signature for the user device-base station pair can be determined based at least in part upon the received signal at 404. The spatial signature can be based upon the direction of arrival of the signal, the number of signal multipaths, the signal attenuation or any other indicia of the spatial relationship between the user device and the base station. The system may utilize the instant spatial signature or, alternatively, the system may utilize the spatial signatures for multiple instances of the received signal. For example, the system can calculate an average spatial signature based upon the spatial signatures for the previous five instances of the received signal. Alternative methods for combining instances of the spatial signature, including weighted averaging, will be readily apparent to those of ordinary skill in the art. Due to the mobility of the user devices, spatial signatures can vary over time as a function of the spatial relationship between the user devices and a base station. However, due to the typically large distances separating user devices from a base station, the spatial signature is unlikely to vary significantly during a voice conversation or data exchange.

At 406, a beam weight vector is determined based upon the received signal and the spatial signature of the received signal. The beam weight vector may be calculated so as to minimize the mean square error (MMSE) of the signal. In one or more embodiments, the beam weight vector may be calculated for each instance of the received signal. Alternatively, the beam weight vector may be calculated periodically, based upon a predetermined period of time or number of instances of the received signal. In one or more embodiments, the beam weight vector may be recalculated based upon a change in the spatial relationship between the user device and the base station. For example, if the spatial signature changes by an amount greater than a predetermined threshold. Alternatively, the beam weight vector may be calculated upon first receipt of the received signal and used for all future signal instances. In one or more embodiments, the beam weight vector for one or more user device signals may be stored in a lookup table and retrieved upon receipt of a signal from the user device. At 408, the beam weight vector is applied to the signal received at the receive antennas of the base station to obtain data contained within the signal.

Figure 5:
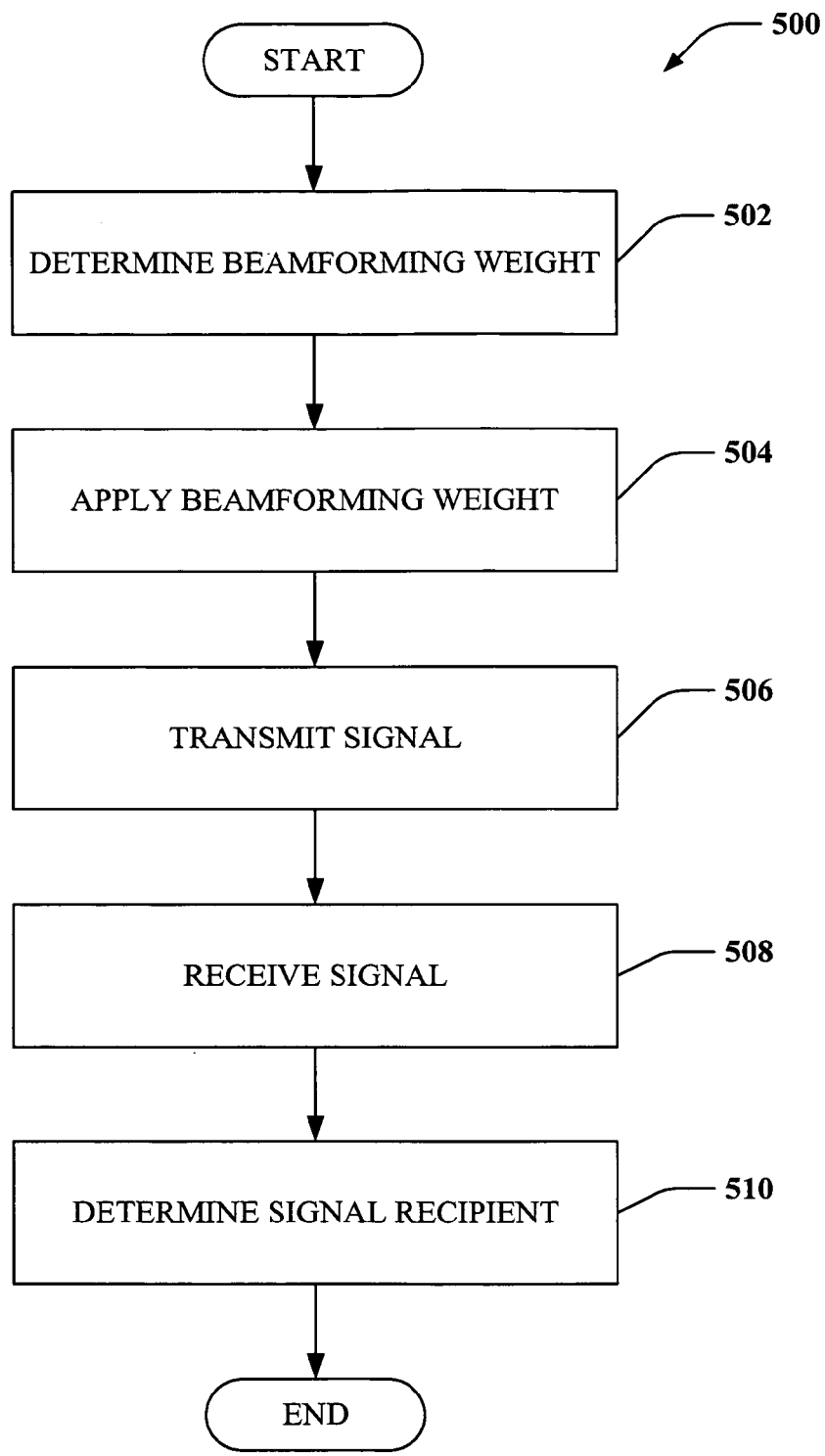
FIG. 5 illustrates a methodology for a downlink transmission in accordance with one or more aspects presented herein.

Referring now to FIG. 5, a methodology 500 for a downlink transmission in a wireless communication environment in accordance with one or more embodiments presented herein is illustrated. At 502, a beamforming weight is determined prior to transmission of the signal by the base station. The beamforming weight is based at least in part upon the spatial signature of the user device-base station pair. The beamforming weight can be obtained from simple beamforming based upon a normalized channel response. Alternatively, the beamforming weight can be obtained by eigen-beamforming based upon the most significant eigenvector of the channel correlation matrix. In a further alternative, the most significant eigenvector can be selected such that the sum data rate of the spatially multiplexed user devices is maximized. At 504, the beamforming weight is applied to the data to be transmitted to the user device. At 506, the beamform weighted signal is transmitted to the user device. One or more user devices receive the beamform weighted signal at 508. At 510, user devices receiving the beamform weighted signal determine whether they are the intended recipient of the signal based upon the spatial signature and the beamforming weight.

If the spatial signatures of user devices scheduled on the same traffic channel are too similar, such as when the user devices are aligned along the same direction from the base station, the signal from the two user devices will collide causing loss of data. Consequently, capturing data transmissions from multiple user devices or data transmissions to user devices depends on the spatial configuration of user devices assigned to the traffic channel. Accordingly, grouping of user devices utilizing the same traffic channel should be coordinated to maximize throughput.

Using SDM, multiple user devices can be assigned to a single traffic channel. User devices may be randomly distributed over the traffic channels. However, to fully exploit SDM, user devices assigned to a traffic channel should be substantially spatially orthogonal or disparate. While the spatial signatures of the user devices are unlikely to be perfectly orthogonal, signals from significantly spatially disparate user devices can be distinguished based upon spatial indicia. To facilitate separation of user device signals, user devices should be assigned to maximize the spatial orthogonality of the user devices assigned to a single traffic channel.

Figure 6:
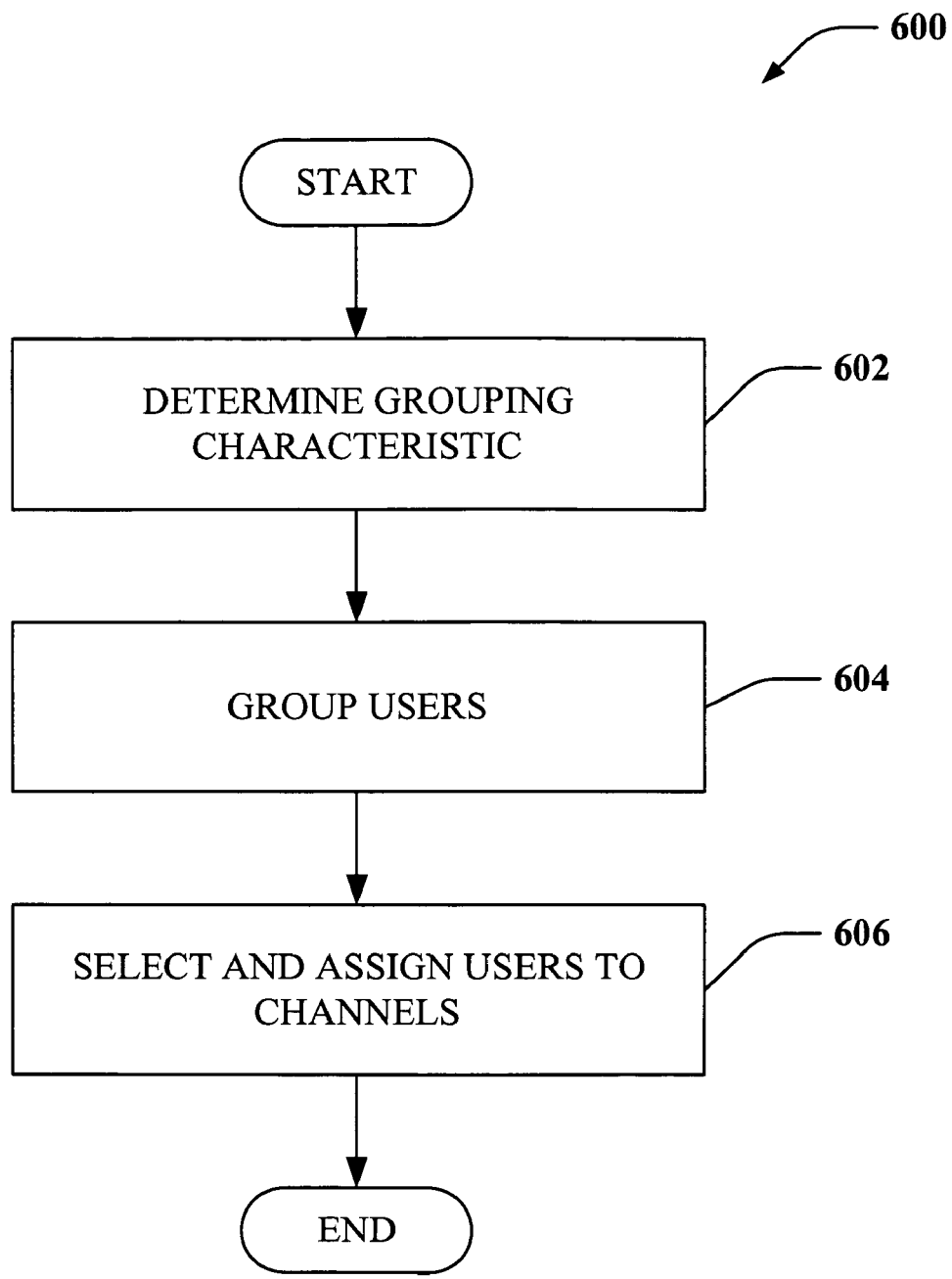
FIG. 6 illustrates a methodology for grouping user devices for wireless communication in accordance with one or more aspects presented herein.

Referring now to FIG. 6, a methodology 600 for grouping user devices for wireless communication in accordance with one or more embodiments presented herein is illustrated. At 602, a grouping characteristic or characteristics for each user device are determined. The grouping characteristic can be any indicator of the spatial relationship of the user device to the base station or any combination of indicators. For example, in one or more embodiments, the grouping characteristic can be the direction of arrival of the signal at the base station. In addition, the distance between the user device and base station may be incorporated into the grouping characteristic. In particular, if the direction of arrival of the signal from one or more user devices is indistinguishable, the signals can be separated based upon distance between the user device and the base station. Distance may be reflected in the signal to interference and noise ratio (SINR) of the signals. Alternatively, the degree of resolvability of different spatial signatures can be used as the grouping characteristic. For example, the order of magnitude of separation of any pair of spatial signatures can be evaluated by computing the inner product of the two spatial signatures. A pair with a high resolvability will be considered sufficiently distinct to be placed in the same group and scheduled on the same traffic channel.

After the grouping characteristic for the user devices is determined, the user devices can be partitioned into subsets based upon the grouping characteristic at 604. In one or more embodiments, user devices with similar or aligned grouping characteristics may be grouped together in a subset. The user devices may be grouped using a predetermined threshold range, such if the difference between the grouping characteristics of a first and second user device is outside of the predetermined threshold range, the user devices are assigned to different subsets. The user devices may be divided into any number of subsets such that user devices with dissimilar grouping characteristics are partitioned into separate subsets. At 606, user devices are selected from the subsets and assigned to channels. Typically, no more than one user device from each subset should be assigned to a single channel. This ensures that the user devices assigned to each channel will have disparate grouping characteristics and consequently, disparate spatial signatures, thereby facilitating separation of the user device signals.

Figure 7:
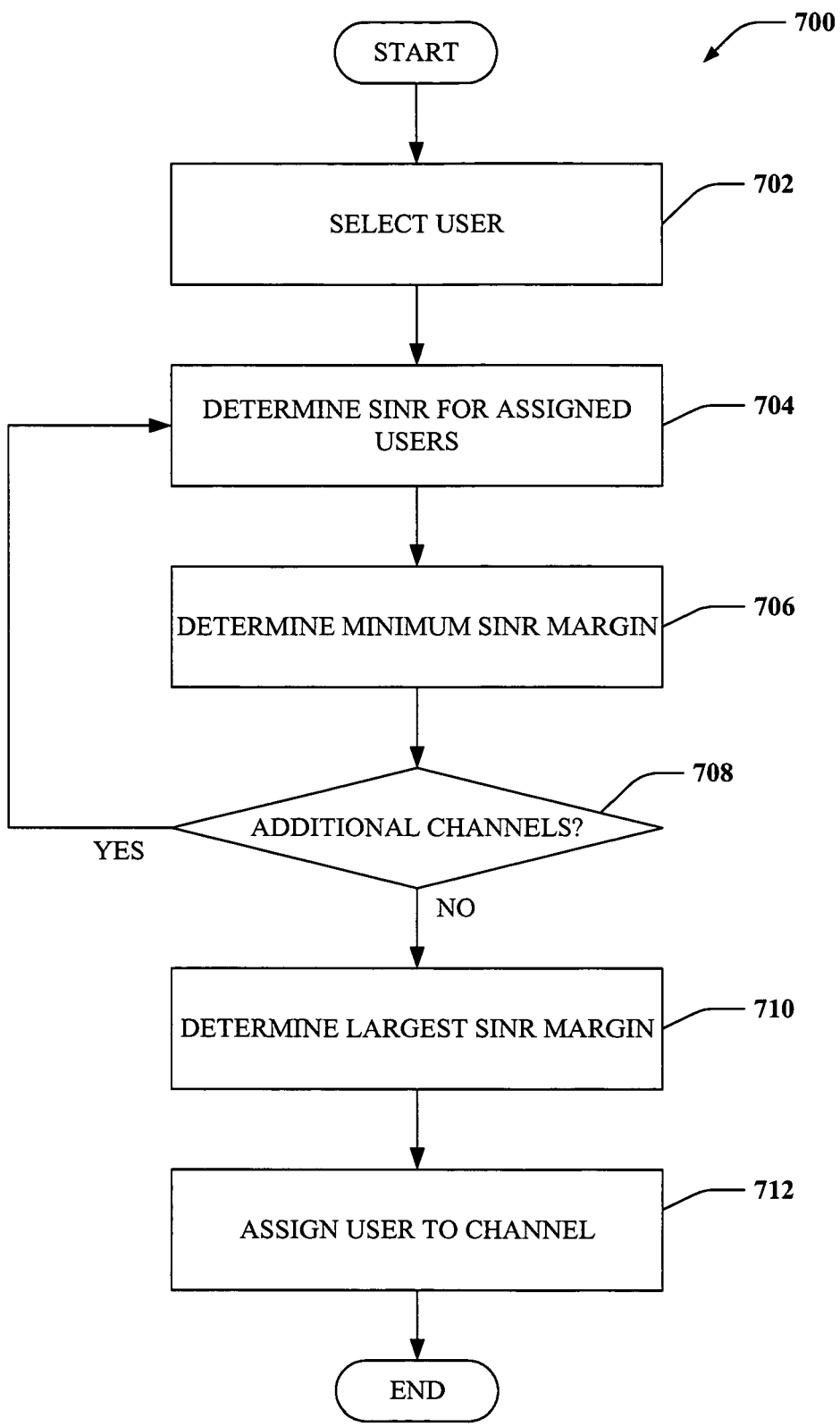
FIG. 7 illustrates a methodology utilizing the signal to interference and noise ratio (SINR) to group the users in accordance with one or more aspects presented herein.

Referring now to FIG. 7, a methodology 700 utilizing the SINR as grouping characteristic is illustrated. At 702, a user device is selected from the set of active, unassigned user devices that have data to transmit. Each user device has a minimum SINR threshold associated with it. The minimum SINR threshold may be based, at least in part, upon coding and modulation schemes as well as the packet error requirement of the user device. At 704, the SINR is determined for each of the user devices currently assigned to a selected channel. At 706, a minimum SINR margin for the selected user device and the selected channel is calculated. The minimum SINR margin is the smallest difference between the minimum SINR threshold of the selected user device and the SINRs of the user devices currently assigned to the selected channel. At 708, it is determined if there are additional channels to analyze. If yes, the method continues at 704, where the SINRs for the user devices for the next selected channel are determined. If no, at 710 the SINR margins of the channels are compared and the largest SINR margin is determined. At 712, the selected user device is assigned to the channel with the largest SINR margin.

Typically, the maximum number of user devices on a single traffic channel that can be distinguished from each other based upon the spatial relationship between the user device and the base station is equal to the number of antennas used to receive the user device signals at the base station. However, the maximum number of user devices need not be assigned to the channels at all times. In one or more embodiments, user devices may be assigned to separate channels until the number of user devices exceeds the number of available channels in the system. At that time, the user devices may be grouped based upon the grouping characteristic and assigned using one of the methodologies discussed above. In one or more embodiments, the maximum number of user devices may be assigned to each channel. This may be appropriate for particularly busy sectors, where the number of user devices is likely to be close to the maximum system capacity. For example, the maximum number of user devices, N, may be assigned to the first channel. After which, the next N orthogonal or disparate user devices may be assigned to the second channel and so forth, until either all the user devices have been assigned or all the available channels have been exhausted. Alternatively, user devices may be evenly distributed across the channels, minimizing the number of user devices on any one channel.

In general, user devices are capable of relocating or being relocated during voice or data transmission, thereby changing the spatial relationship between user device and base station. While relocation of the user devices may not greatly affect the spatial indicia or spatial signature of the user device due to the large distances involved, the user device subset may be updated to reflect these changes. In one or more embodiments the user device subsets may be updated to ensure that the user devices assigned to the same channel remain substantially spatially orthogonal or disparate. The user device groups can be updated periodically based upon a predetermined time interval, a predetermined number of data transmissions or a change in the number of currently assigned user devices. The time interval may be adjustable depending upon the amount of user devices or data traffic. Alternatively, the user device groups may be updated after transmission or receipt of a predetermined the number of data transmissions or after the addition or deletion of a predetermined number of user devices.

Figure 8:
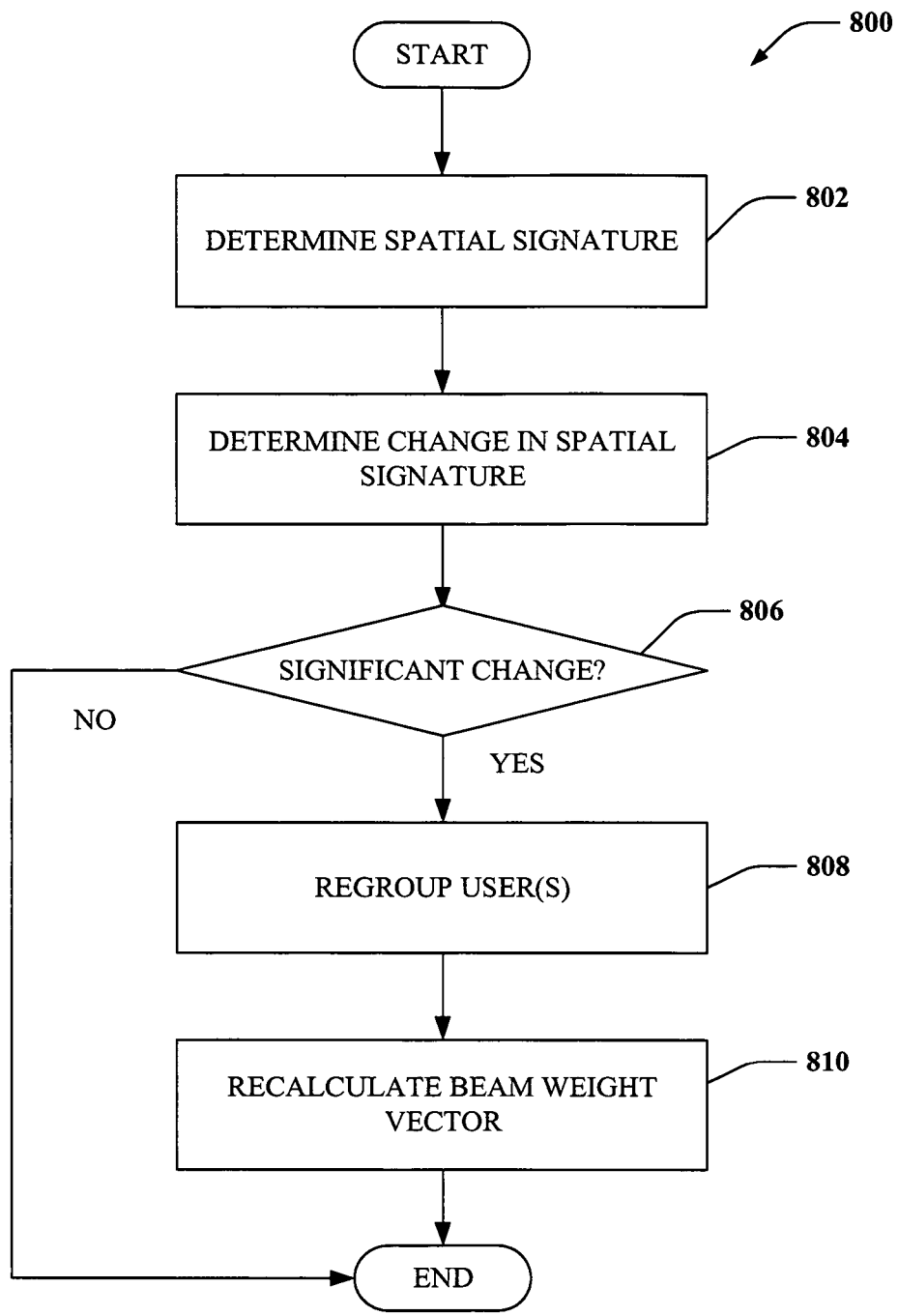
FIG. 8 illustrates a methodology for dynamically updating user device groups for wireless communication in accordance with one or more aspects presented herein.

Referring now to FIG. 8, a methodology 800 for dynamically updating user device groups for wireless communication in accordance with one or more embodiments presented herein is illustrated. At 802, the spatial signature or grouping characteristic for one or more user devices is calculated. The spatial signature or grouping characteristic may be calculated periodically or upon receipt of each instance of a signal. At 804, the change in the spatial signature or grouping characteristic is determined. The system can maintain one or more previous values for the spatial signature or grouping characteristic. The spatial signature or grouping characteristic may be compared to a grouping characteristic standard, which could include a previous value of the grouping characteristic, an average of the previous values or any combination of prior values to determine whether the user device has been relocated. Alternatively, the system may use the initial value of the spatial signature or grouping characteristic as the grouping characteristic standard, such that the current spatial signature or grouping characteristic of the user device may be compared to that initial value. At 806 it is determined whether the change in the spatial signature or grouping characteristic, if any, is significant. If no, the method terminates and the user device subsets remain unchanged. If yes, the user device subsets may be updated at 808. Updating the user device subsets may include determining the grouping characteristic for each user device and reassigning the user devices in one or more subsets. In one or more embodiments, all of the user devices may be reevaluated and reassigned to the subsets or channels. Alternatively, a subset of user devices or a single user device may be reassigned. User devices selected to be reassigned may be determined based upon the amount of change in the spatial signature or grouping characteristic for an individual user device, a group of user devices or the aggregate change in all user devices. The user devices to be reassigned may also be determined based upon the amount of time since the subsets were last determined or the number of user devices assigned or removed since the subsets were last determined. At 810, the beam weight vector for each updated user device can be recalculated based upon the current spatial signature. The recalculated beam weight vector can be stored in a lookup table.

In one or more embodiments, the performance of the system may be monitored to determine whether the user devices should be reassigned. For example, after assigning a user device to a channel, a channel quality indicator (CQI) for the channel to which the user device has been assigned can be monitored. If the CQI is below a predetermined threshold, one or more user device can be reevaluated and reassigned. In one or more embodiments, the CQI for all channels, a subset of channels or a single channel can be periodically evaluated to determine whether to reassign user devices. Alternatively, the SINR for all user devices, a subset of user devices or a single user device may be monitored.

Figure 9:
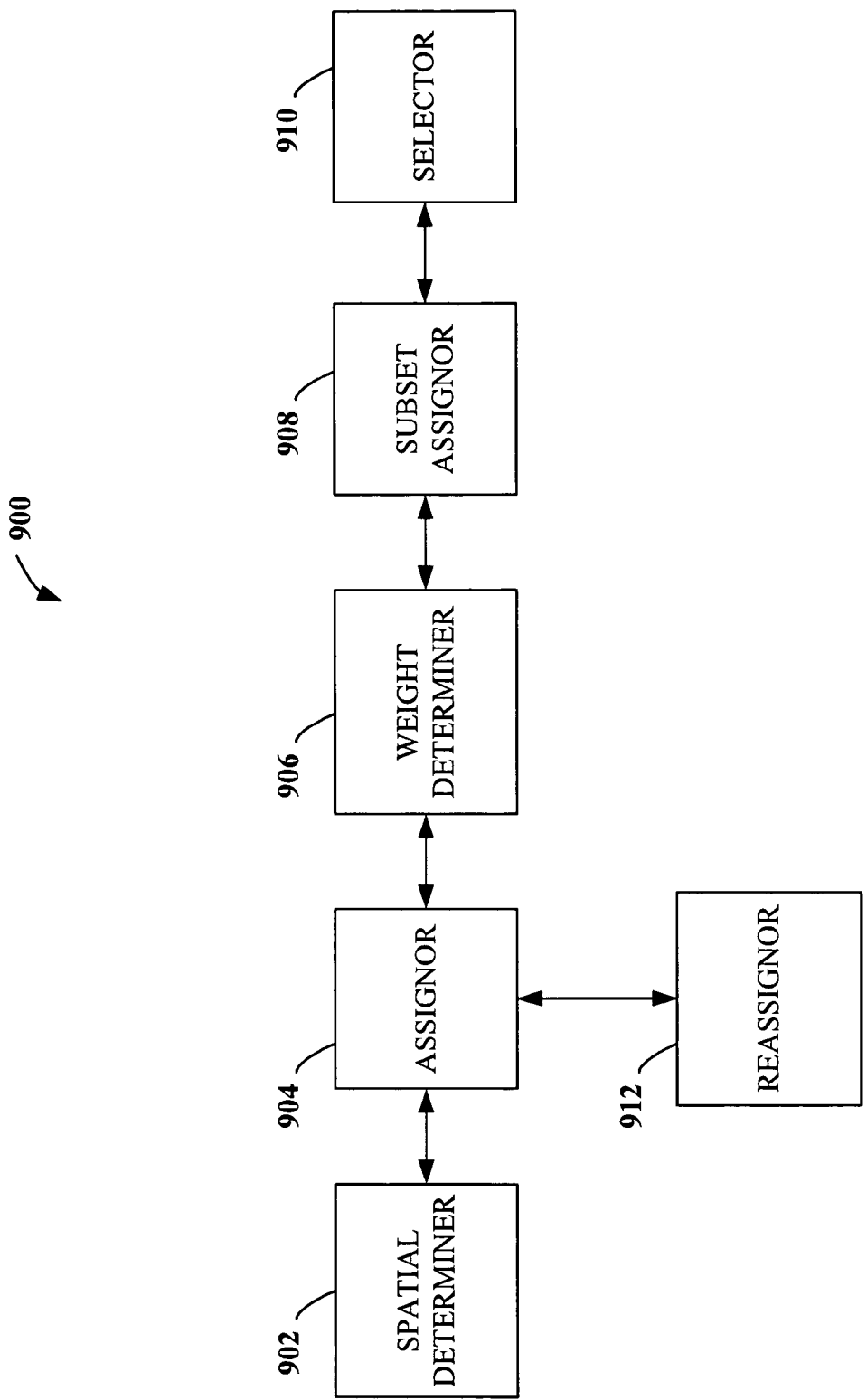
FIG. 9 is an illustration of an apparatus for increasing system capacity in a sector of a wireless communication environment in accordance with various aspects.

Referring now to FIG. 9, a system or apparatus 900 for increasing system capacity in a sector of a wireless communication environment in accordance with one or more aspects presented herein is illustrated. System 900 includes a spatial determiner 902 for determining the spatial signatures or spatial grouping characteristics of user devices and an assignor 904 for assigning user devices to channels, such that any two user devices assigned to a channel are substantially spatially orthogonal or spatially disparate. System 900 can also include a weight determiner 906 that determines weights to be applied to transmissions between user devices and base stations. In addition, system 900 can include a subset assignor 908 and a selector 910. Subset assignor 908 can be used to assign user devices to one or more subsets. Selector 910 can select user devices from the subsets to be assigned to channels, such that spatially orthogonal or disparate user devices are assigned to the same channel. System 900 can also include a reassignor 912 that can reassign user devices periodically, based at least in part upon changes in the spatial signatures of the user devices and/or based upon system performance.

Figure 10:
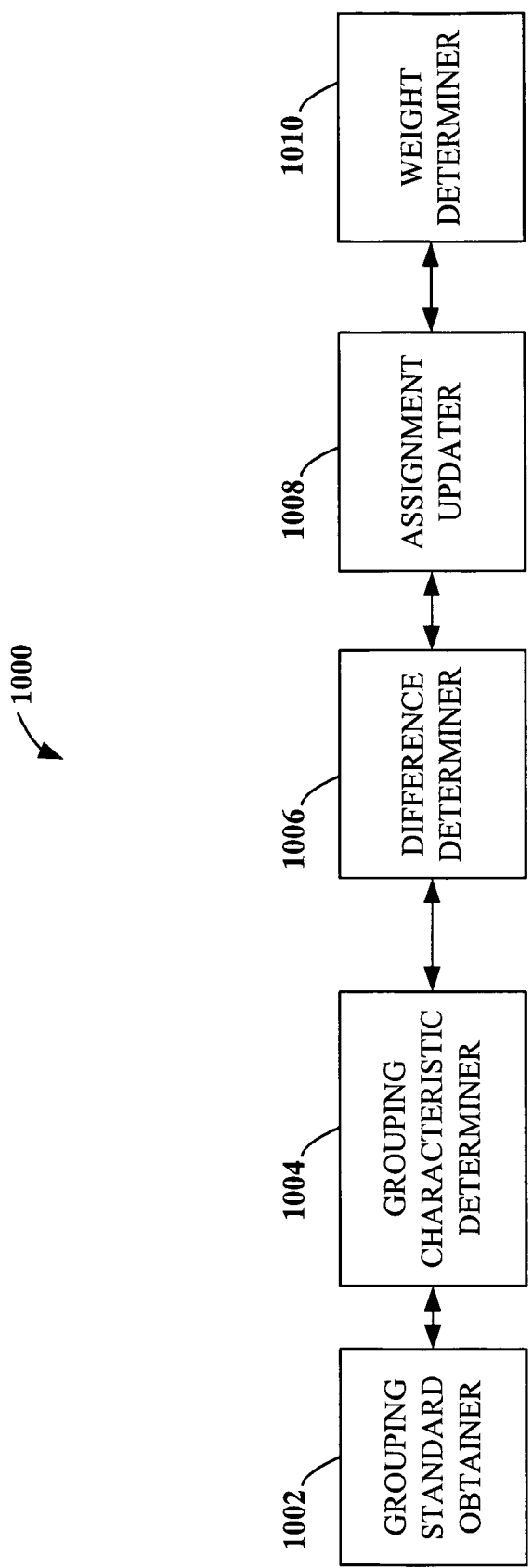
FIG. 10 is an illustration of an apparatus for updating channel assignments in a wireless communication environment in accordance with various aspects.

Referring now to FIG. 10, a system or apparatus 1000 for updating channel assignments in a wireless communication environment in accordance with one or more aspects presented herein is illustrated. System 1000 includes a grouping characteristic standard obtainer 1002 for obtaining a value for the grouping characteristic standard and a grouping characteristic determiner 1004 for determining the current value of the spatial grouping characteristic for the user devices. System 1000 also includes a difference determiner 1006 for determining if there is a significant difference between the grouping characteristic standard and the value of the grouping characteristic of one or more user devices. In addition, system 1000 also includes a channel assignment updater 1008 for updating the channel assignment of the user devices if there is a significant difference and a weight determiner 1010 for calculating a beam weight vector for the updated user devices.

Figure 11:
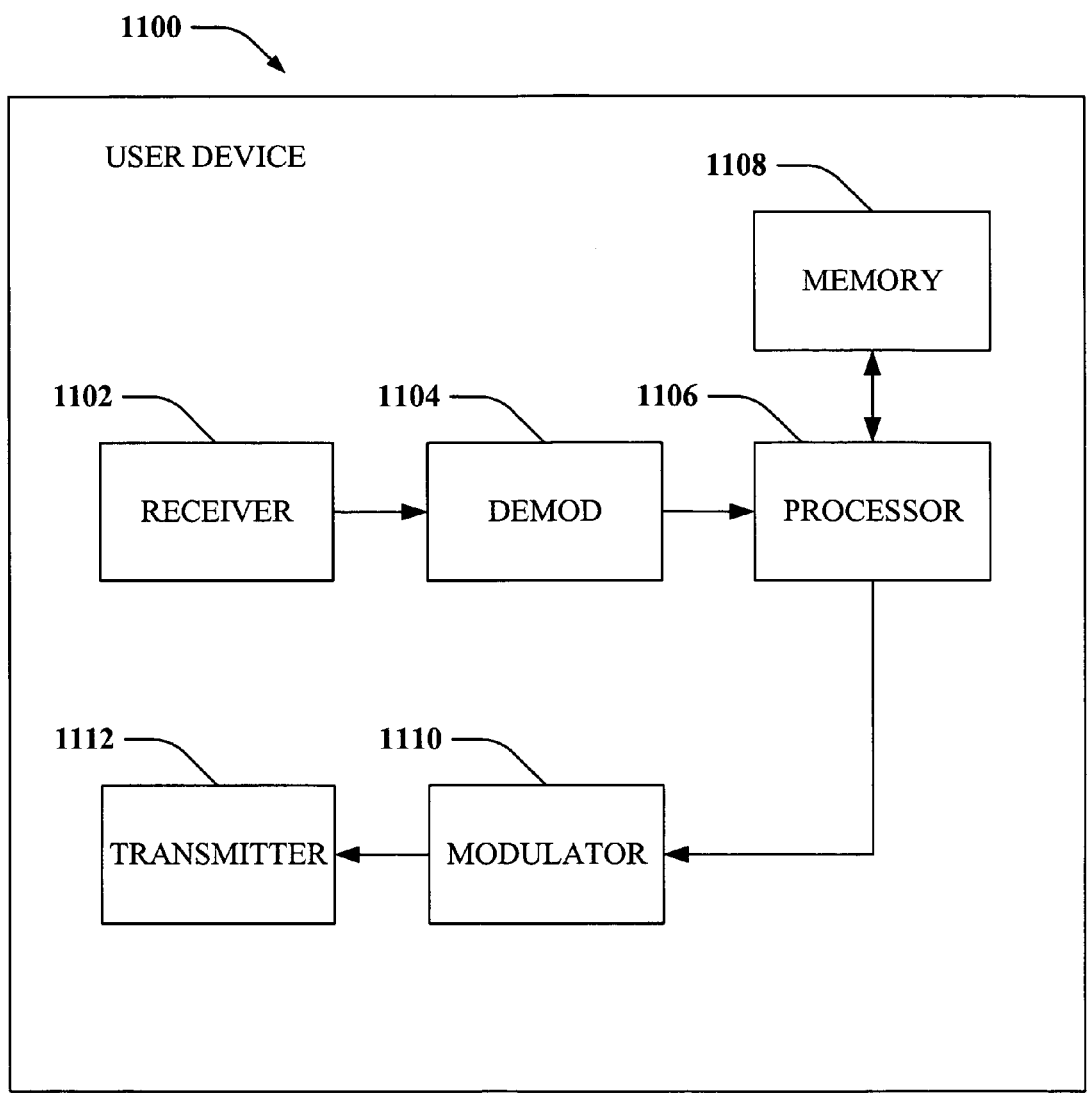
FIG. 11 is an illustration of a system that facilitates use of spatial signatures to increase system capacity in a wireless communication environment in accordance with various aspects.

FIG. 11 is an illustration of a system 1100 that facilitates SDM in a wireless communication environment to increase system capacity limits in accordance with one or more embodiments set forth herein. System 1100 can reside in a base station and/or in a user device, as will be appreciated by one skilled in the art. System 1100 comprises a receiver 1102 that receives a signal and from, for instance one or more receive antennas, and performs typical actions thereon (e.g., filters, amplifies, downconverts, etc.) the received signal and digitizes the conditioned signal to obtain samples. A demodulator 1104 can demodulate and provide received pilot symbols to a processor 1106 for channel estimation.

Processor 1106 can be a processor dedicated to analyzing information received by receiver component 1102 and/or generating information for transmission by a transmitter 1112. Processor 1106 can be a processor that controls one or more components of user device 1100, and/or a processor that analyzes information received by receiver 1102, generates information for transmission by a transmitter 1112, and controls one or more components of user device 1100. Processor 1106 can include an optimization component (not shown) that coordinates channel assignments. It is to be appreciated that the optimization component can include optimization code that performs utility based analysis in connection with assigning user devices to channels. The optimization code can utilize artificial intelligence based methods in connection with performing inference and/or probabilistic determinations and/or statistical-based determinations in connection with optimizing user channel assignment.

User device 1100 can additionally comprise memory 1108 that is operatively coupled to processor 1106 and that stores information related to spatial information, lookup tables comprising information related thereto, and any other suitable information related to SDM as described herein. Memory 1108 can additionally store protocols associated with generating lookup tables, etc., such that user device 1100 can employ stored protocols and/or algorithms to increase system capacity. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory. The processor 1106 is connected to a symbol modulator 1110 and transmitter 1112 that transmits the modulated signal.

Figure 12:
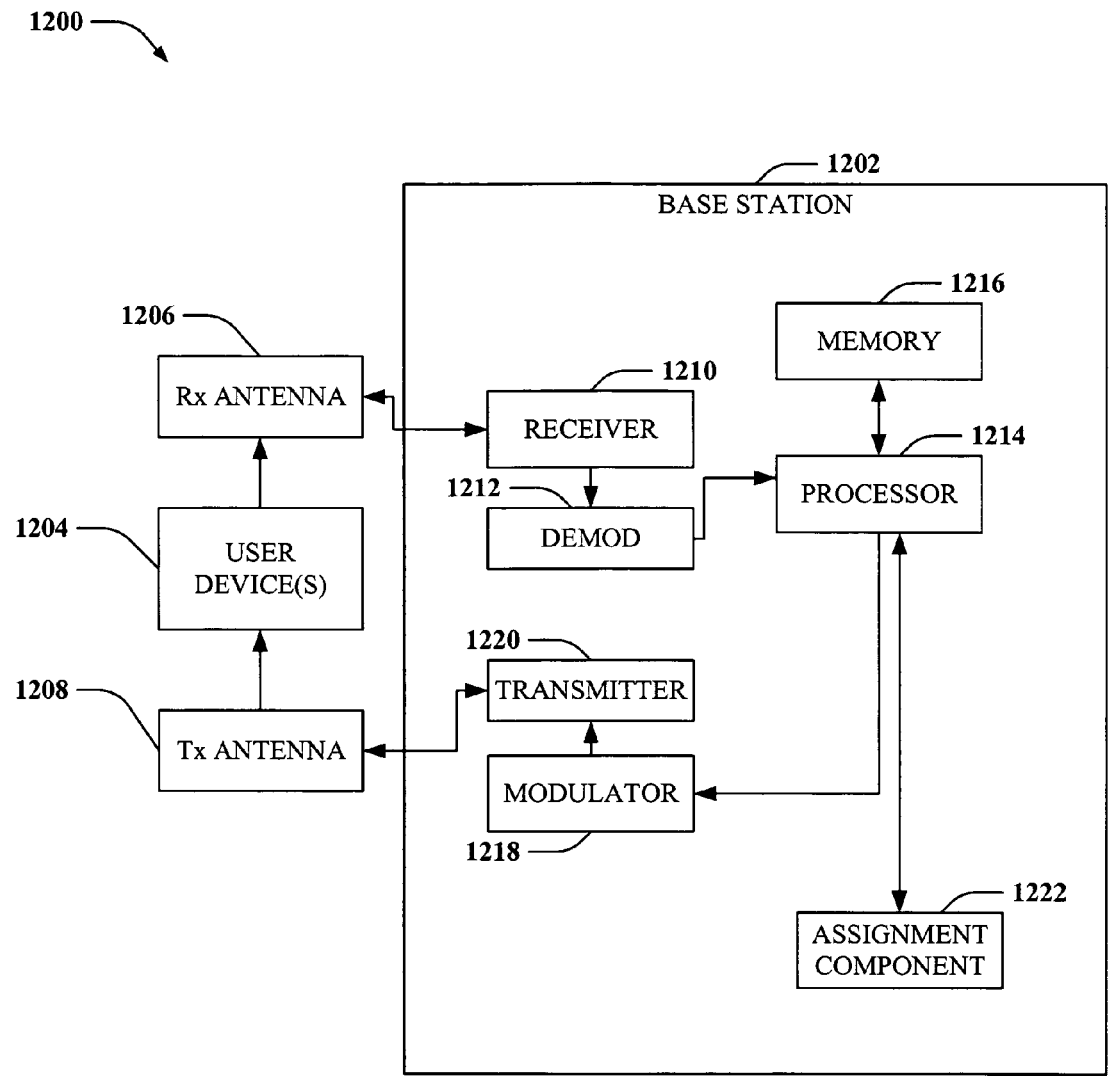
FIG. 12 is an illustration of a system that utilizes spatial signatures to group user devices and increase system capacity in a wireless communication environment in accordance with various aspects.

FIG. 12 is an illustration of a system 1200 that facilitates increasing system capacity in a communication environment in accordance with various aspects. System 1200 comprises a base station 1202 with a receiver 1210 that receives signal(s) from one or more user devices 1204 via a plurality of receive antennas 1206, and transmits to the one or more user devices 1204 through a transmit antenna 1208. Receiver 1210 can receive information from receive antennas 1206 and is operatively associated with a demodulator 1212 that demodulates received information. Receiver 1210 can be, for example, a Rake receiver (e.g., a technique that individually processes multi-path signal components using a plurality of baseband correlators, . . . ), an MMSE-based receiver, or some other suitable receiver for separating out user devices assigned thereto, as will be appreciated by one skilled in the art. Demodulated symbols are analyzed by a processor 1214 that is similar to the processor described above with regard to FIG. 10, and is coupled to a memory 1216 that stores information related to user device assignments, lookup tables related thereto and the like. Receiver output for each antenna can be jointly processed by receiver 1210 and/or processor 1214. A modulator 1218 can multiplex the signal for transmission by a transmitter 1220 through transmit antenna 1208 to user devices 1204.

Base station 1202 further comprises an assignment component 1222, which can be a processor distinct from or integral to processor 1214, and which can evaluate a pool of all user devices in a sector served by base station 1204 and can group user devices into subsets (e.g., such as a subset of user devices 1204) based at least in part on the spatial signatures of individual user devices (e.g., using an SDMA technique or the like). For instance, beamforming weights can be employed to uniquely delineate one user device from the next, where a user device recognizes only those communication signals that exhibit the user device's beamforming weights and the spatial signature of its transmissions identifies the user device to a base station.

Assignment component 1222 can group user devices into subsets according to a number of user devices that can be supported by the number of receive antennas. For instance, all user devices in a sector can be divided into subsets based at least in part on their geographic proximity to each other.

It is to be understood that although the foregoing is described with regard to scaling reverse link system capacity linearly as a number of receive antennas is increased in a wireless communication environment, such techniques can be applied to forward link transmission and increasing a number of transmit antennas, as will be appreciated by one skilled in the art. Moreover, according to various aspects, multiple receivers can be employed (e.g., one per receive antenna), and such receivers can communicate with each other to provide improved estimates of user data.

Figure 13:
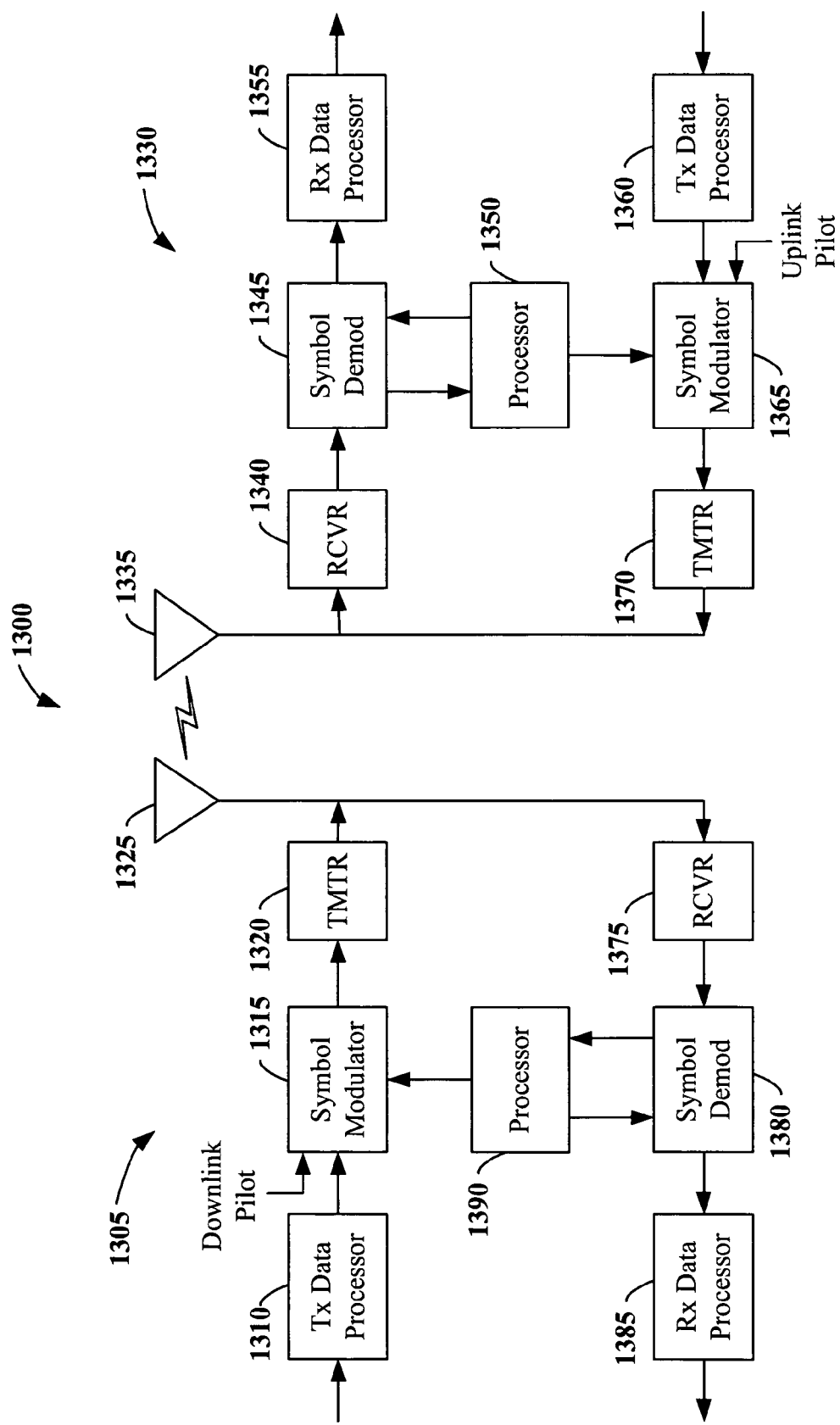
FIG. 13 is an illustration of a wireless communication environment that can be employed in conjunction with the various systems and methods described herein.

FIG. 13 shows an exemplary wireless communication system 1300. The wireless communication system 1300 depicts one base station and one terminal for sake of brevity. However, it is to be appreciated that the system can include more than one base station and/or more than one terminal, wherein additional base stations and/or terminals can be substantially similar or different for the exemplary base station and terminal described below. In addition, it is to be appreciated that the base station and/or the terminal can employ the systems (FIGS. 9-12) and/or methods (FIGS. 4-8) described herein to facilitate wireless communication there between.

Referring now to FIG. 13, on a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and provides them to a transmitter unit (TMTR) 1320. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), or code division multiplexed (CDM).

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals may transmit pilot concurrently on the uplink on their respective assigned sets of pilot subcarriers, where the pilot subcarrier sets may be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, SDMA, IFDMA, LFDMA, etc.), multiple terminals can transmit concurrently on the uplink. For such a system, the pilot subcarriers may be shared among different terminals. The channel estimation techniques may be used in cases where the pilot subcarriers for each terminal span the entire operating band (possibly except for the band edges). Such a pilot subcarrier structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1390 and 1350.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for increasing system capacity for a wireless communication environment, the method comprising:
   selecting, by a wireless communication apparatus, a user device from a set of active, unassigned user devices that have data to transmit, wherein the selected user device has a minimum spatial grouping characteristic threshold associated with it;
   determining, by the wireless communication apparatus, a spatial grouping characteristic margin for each of a plurality of channels, wherein the spatial grouping characteristic margin corresponding to a particular channel indicates a smallest difference between the minimum spatial grouping characteristic threshold of the selected user device and spatial grouping characteristics of user devices that are currently assigned to the channel;
   comparing, by the wireless communication apparatus, spatial grouping characteristic margins for the plurality of channels in order to determine a largest spatial grouping characteristic margin; and
   assigning, by the wireless communication apparatus, the selected user device to a channel that corresponds to the largest spatial grouping characteristic margin.

2. The method of claim 1, wherein the spatial grouping characteristic comprises a signal-to-interference-and-noise ratio.

3. The method of claim 1, wherein the spatial grouping characteristic comprises a direction of arrival of a signal at the wireless communication apparatus.

4. The method of claim 1, wherein the minimum spatial grouping characteristic threshold is based at least in part on coding and modulation schemes and a packet error requirement of the user device.

5. The method of claim 1, further comprising:
   determining a change in a spatial signature or a spatial grouping characteristic of the selected user device; and
   re-assigning the selected user device to a different one of the plurality of channels based on the change in the spatial signature or the spatial grouping characteristic.

6. The method of claim 1, further comprising:
   monitoring system performance; and
   re-assigning the selected user device to a different one of the plurality of channels based on the system performance.

7. The method of claim 1, further comprising:
   monitoring a channel quality indicator (CQI) of the channel to which the selected user device is assigned; and
   re-assigning the selected user device to a different one of the plurality of channels if the CQI falls below a defined threshold.

8. The method of claim 1, wherein the wireless communication apparatus is a base station, and further comprising:
   receiving, at two or more receive antennas at the base station, a signal transmitted by the user device;
   determining a spatial signature for the user device-base station pair based at least in part upon the received signal;
   calculating a beam weight vector based upon the received signal and the spatial signature of the received signal, wherein the beam weight vector is calculated so as to minimize a mean square error (MMSE) of the signal; and
   applying the beam weight vector to the signal received at the receive antennas of the base station to obtain data contained within the signal.

9. The method of claim 8, wherein the spatial signature is based upon at least one of a direction of arrival of the signal, a number of signal multipaths, and attenuation of the signal.

10. The method of claim 1, wherein the wireless communication apparatus is a base station, and further comprising:
    determining a beamforming weight prior to transmission of a signal by the base station, wherein the beamforming weight is based at least in part upon a spatial signature of the user device-base station pair;
    applying the beamforming weight to data to be transmitted to the user device, thereby producing a beamform-weighted signal; and
    transmitting the beamform-weighted signal to the user device.

11. A wireless communication apparatus configured to increase system capacity for a wireless communication environment, comprising:
    a processor;
    memory in electronic communication with the processor; and
    instructions stored in the memory, the instructions being executable to:
      select a user device from a set of active, unassigned user devices that have data to transmit, wherein the selected user device has a minimum spatial grouping characteristic threshold associated with it;
      determine a spatial grouping characteristic margin for each of a plurality of channels, wherein the spatial grouping characteristic margin corresponding to a particular channel indicates a smallest difference between the minimum spatial grouping characteristic threshold of the selected user device and spatial grouping characteristics of user devices that are currently assigned to the channel;
      compare spatial grouping characteristic margins for the plurality of channels in order to determine a largest spatial grouping characteristic margin; and
      assign the selected user device to a channel that corresponds to the largest spatial grouping characteristic margin.

12. The wireless communication apparatus of claim 11, wherein the spatial grouping characteristic comprises a signal-to-interference-and-noise ratio.

13. The wireless communication apparatus of claim 11, wherein the spatial grouping characteristic comprises a direction of arrival of a signal at the wireless communication apparatus.

14. The wireless communication apparatus of claim 11, wherein the minimum spatial grouping characteristic threshold is based at least in part on coding and modulation schemes and a packet error requirement of the user device.

15. The wireless communication apparatus of claim 11, wherein the instructions are also executable to:
- determine a change in a spatial signature or a spatial grouping characteristic of the selected user device; and
- re-assign the selected user device to a different one of the plurality of channels based on the change in the spatial signature or the spatial grouping characteristic.

16. The wireless communication apparatus of claim 11, wherein the instructions are also executable to:
- monitor system performance; and
- re-assign the selected user device to a different one of the plurality of channels based on the system performance.

17. The wireless communication apparatus of claim 11, wherein the instructions are also executable to:
- monitor a channel quality indicator (CQI) of the channel to which the selected user device is assigned; and
- re-assign the selected user device to a different one of the plurality of channels if the CQI falls below a defined threshold.

18. The wireless communication apparatus of claim 11, wherein the wireless communication apparatus is a base station, and wherein the instructions are also executable to:
- receive, at two or more receive antennas at the base station, a signal transmitted by the user device;
- determine a spatial signature for the user device-base station pair based at least in part upon the received signal;
- calculate a beam weight vector based upon the received signal and the spatial signature of the received signal, wherein the beam weight vector is calculated so as to minimize a mean square error (MMSE) of the signal; and
- apply the beam weight vector to the signal received at the receive antennas of the base station to obtain data contained within the signal.

19. The wireless communication apparatus of claim 18, wherein the spatial signature is based upon at least one of a direction of arrival of the signal, a number of signal multipaths, and attenuation of the signal.

20. The wireless communication apparatus of claim 11, wherein the wireless communication apparatus is a base station, and wherein the instructions are also executable to:
- determine a beamforming weight prior to transmission of a signal by the base station, wherein the beamforming weight is based at least in part upon a spatial signature of the user device-base station pair;
- apply the beamforming weight to data to be transmitted to the user device, thereby producing a beamform-weighted signal; and
- transmit the beamform-weighted signal to the user device.

21. A wireless communication apparatus configured to increase system capacity for a wireless communication environment, comprising:
- means for selecting a user device from a set of active, unassigned user devices that have data to transmit, wherein the selected user device has a minimum spatial grouping characteristic threshold associated with it;
- means for determining a spatial grouping characteristic margin for each of a plurality of channels, wherein the spatial grouping characteristic margin corresponding to a particular channel indicates a smallest difference between the minimum spatial grouping characteristic threshold of the selected user device and spatial grouping characteristics of user devices that are currently assigned to the channel;
- means for comparing spatial grouping characteristic margins for the plurality of channels in order to determine a largest spatial grouping characteristic margin; and
- means for assigning the selected user device to a channel that corresponds to the largest spatial grouping characteristic margin.

22. The wireless communication apparatus of claim 21, wherein the spatial grouping characteristic comprises a signal-to-interference-and-noise ratio.

23. The wireless communication apparatus of claim 21, wherein the spatial grouping characteristic comprises a direction of arrival of a signal at the wireless communication apparatus.

24. The wireless communication apparatus of claim 21, wherein the minimum spatial grouping characteristic threshold is based at least in part on coding and modulation schemes and a packet error requirement of the user device.

25. The wireless communication apparatus of claim 21, further comprising:
- means for determining a change in a spatial signature or a spatial grouping characteristic of the selected user device; and
- means for re-assigning the selected user device to a different one of the plurality of channels based on the change in the spatial signature or the spatial grouping characteristic.

26. The wireless communication apparatus of claim 21, further comprising:
- means for monitoring system performance; and
- means for re-assigning the selected user device to a different one of the plurality of channels based on the system performance.

27. The wireless communication apparatus of claim 21, further comprising:
- means for monitoring a channel quality indicator (CQI) of the channel to which the selected user device is assigned; and
- means for re-assigning the selected user device to a different one of the plurality of channels if the CQI falls below a defined threshold.

28. The wireless communication apparatus of claim 21, wherein the wireless communication apparatus is a base station, and further comprising:
- means for receiving, at two or more receive antennas at the base station, a signal transmitted by the user device;
- means for determining a spatial signature for the user device-base station pair based at least in part upon the received signal;
- means for calculating a beam weight vector based upon the received signal and the spatial signature of the received signal, wherein the beam weight vector is calculated so as to minimize a mean square error (MMSE) of the signal; and
- means for applying the beam weight vector to the signal received at the receive antennas of the base station to obtain data contained within the signal.

29. The wireless communication apparatus of claim 28, wherein the spatial signature is based upon at least one of a direction of arrival of the signal, a number of signal multipaths, and attenuation of the signal.

30. The wireless communication apparatus of claim 21, wherein the wireless communication apparatus is a base station, and further comprising:
- means for determining a beamforming weight prior to transmission of a signal by the base station, wherein the beamforming weight is based at least in part upon a spatial signature of the user device-base station pair;
- means for applying the beamforming weight to data to be transmitted to the user device, thereby producing a beamform-weighted signal; and means for transmitting the beamform-weighted signal to the user device.

31. A non-transitory computer-readable medium comprising instructions that are executable to:
  select a user device from a set of active, unassigned user devices that have data to transmit, wherein the selected user device has a minimum spatial grouping characteristic threshold associated with it;
  determine a spatial grouping characteristic margin for each of a plurality of channels, wherein the spatial grouping characteristic margin corresponding to a particular channel indicates a smallest difference between the minimum spatial grouping characteristic threshold of the selected user device and spatial grouping characteristics of user devices that are currently assigned to the channel;
  compare spatial grouping characteristic margins for the plurality of channels in order to determine a largest spatial grouping characteristic margin; and
  assign the selected user device to a channel that corresponds to the largest spatial grouping characteristic margin.

32. The non-transitory computer-readable medium of claim 31, wherein the spatial grouping characteristic comprises a signal-to-interference-and-noise ratio.

33. The non-transitory computer-readable medium of claim 31, wherein the spatial grouping characteristic comprises a direction of arrival of a signal at the wireless communication apparatus.

34. The non-transitory computer-readable medium of claim 31, wherein the minimum spatial grouping characteristic threshold is based at least in part on coding and modulation schemes and a packet error requirement of the user device.

35. The non-transitory computer-readable medium of claim 31, wherein the instructions are also executable to:
  determine a change in a spatial signature or a spatial grouping characteristic of the selected user device; and
  re-assign the selected user device to a different one of the plurality of channels based on the change in the spatial signature or the spatial grouping characteristic.

36. The non-transitory computer-readable medium of claim 31, wherein the instructions are also executable to:
  monitor system performance; and
  re-assign the selected user device to a different one of the plurality of channels based on the system performance.

37. The non-transitory computer-readable medium of claim 31, wherein the instructions are also executable to:
  monitor a channel quality indicator (CQI) of the channel to which the selected user device is assigned; and
  re-assign the selected user device to a different one of the plurality of channels if the CQI falls below a defined threshold.

38. The non-transitory computer-readable medium of claim 31, wherein the wireless communication apparatus is a base station, and wherein the instructions are also executable to:
  receive, at two or more receive antennas at the base station, a signal transmitted by the user device;
  determine a spatial signature for the user device-base station pair based at least in part upon the received signal;
  calculate a beam weight vector based upon the received signal and the spatial signature of the received signal, wherein the beam weight vector is calculated so as to minimize a mean square error (MMSE) of the signal; and
  apply the beam weight vector to the signal received at the receive antennas of the base station to obtain data contained within the signal.

39. The non-transitory computer-readable medium of claim 38, wherein the spatial signature is based upon at least one of a direction of arrival of the signal, a number of signal multipaths, and attenuation of the signal.

40. The non-transitory computer-readable medium of claim 31, wherein the wireless communication apparatus is a base station, and wherein the instructions are also executable to:
  determine a beamforming weight prior to transmission of a signal by the base station, wherein the beamforming weight is based at least in part upon a spatial signature of the user device-base station pair;
  apply the beamforming weight to data to be transmitted to the user device, thereby producing a beamform-weighted signal; and
  transmit the beamform-weighted signal to the user device.

* * * * *